United States Patent [19]

Takahashi

[11] 4,320,319
[45] Mar. 16, 1982

[54] IRONLESS ROTOR WINDING FOR ELECTRIC MOTOR, METHOD AND MACHINE FOR MAKING THE SAME

[76] Inventor: Yuji Takahashi, 609-3, Horinishi, Hatano-shi, Kanagawa-ken, Japan

[21] Appl. No.: 41,182

[22] Filed: May 21, 1979

[30] Foreign Application Priority Data

May 31, 1978 [JP] Japan .................................. 53-64375
Jun. 6, 1978 [JP] Japan .................................. 53-67312

[51] Int. Cl.³ ............................................ H02K 1/22
[52] U.S. Cl. ..................................... 310/266; 310/198
[58] Field of Search ......... 310/185, 266, 171, 40 MM, 310/198, 265, 203, 202, 206, 204, 207, 205, 45, 43, 261, 264, 265; 336/225

[56] References Cited

U.S. PATENT DOCUMENTS

| | | | |
|---|---|---|---|
| 3,191,081 | 6/1965 | Faulhaber | 310/207 |
| 3,360,668 | 12/1967 | Faulhaber | 310/195 |
| 3,360,668 | 12/1967 | Faulhaber | 310/266 |
| 3,441,761 | 4/1969 | Painton | 310/202 |
| 3,529,192 | 9/1970 | Davies | 310/195 |
| 3,634,708 | 1/1972 | Fisher | 310/195 |
| 3,694,907 | 10/1972 | Margrain | 310/195 |
| 4,103,196 | 7/1978 | Saito | 310/266 |
| 4,123,679 | 10/1978 | Miyasaka | 310/266 |
| 4,200,971 | 5/1980 | Shimizu | 310/266 |

FOREIGN PATENT DOCUMENTS

| | | | |
|---|---|---|---|
| 49-22361 | 6/1974 | Japan | 310/266 |
| 52-36702 | 3/1977 | Japan | 310/266 |
| 1090937 | 11/1967 | United Kingdom | 310/266 |

*Primary Examiner*—R. Skudy
*Attorney, Agent, or Firm*—Kenway & Jenney

[57] ABSTRACT

Herein disclosed is an ironless rotor winding for a cup-shaped electric motor. A winding portion is wound through one terminate face of an imaginary column. Another winding portion is wound onto the circumference of the imaginary column at an angle of inclination with respect to the axis of rotation of the column. A further winding portion is wound at the other terminate face of the imaginary column along the circumferential edge of the column. Thus, the overall rigidity of the ironless rotor winding can be increased. In an alternative, the winding portion wound onto the circumference of the imaginary column at an angle of inclination with respect to the axis of rotation is composed of a first segment having a smaller angle of inclination, and a second segment having a larger angle of inclination. Herein also disclosed are method and machine for making the such ironless rotor winding.

5 Claims, 18 Drawing Figures

IRONLESS ROTOR WINDING FOR ELECTRIC MOTOR, METHOD AND MACHINE FOR MAKING THE SAME

BACKGROUND OF THE INVENTION

1. Field of the Invention

The present invention relates to an ironless rotor for an electric motor as well as the method and machine for making the same.

2. Description of the Prior Art

In order to improve the efficiency of a micromotor, a variety of methods for winding an ironless rotor using no iron core having heretofore been proposed. Most of them are directed to an ironless rotor winding wound as a rotor having a drug cup shape. Since the rotor prepared by the winding operation of this type has no iron part, there is no establishment of the hysterisis loss due to the alternate changes in the magnetic flux, and the eddy current loss at the armature side is negligible so that no iron loss need be taken as a whole into consideration. As a result, the output of the ironless motor of this type can be expressed by the following ideal equation no iron loss into account:

$$IaV - Ia^2 R = IaEc,$$

wherein $R = Ra + Rb$;
Ra: Winding Resistance;
Rb: Resistance of Brush;
Ia: Armature Current
V: Input Voltage
Ec: Back Electromotive Force;
IaV: Input;
$Ia^2 R$: Copper Loss; and
IaEc: Output.

If the initial design is made such that the copper loss $Ia^2 R$ may be as low as possible for the input IaV, the output IaEc obtainable can be increased. If, moreover, the mechanical loss inclusive is sufficiently managed, it is possible to provide an ironless motor having a remarkably high efficiency. For the applications of the ironless motor, however, various problems arise in forming the lead wires if it is intended to satisfy the characteristics of the motor such as its r.p.m. or the like. For this reason, a variety of methods for winding an ironless rotor for an electric motor have been proposed. This is because the characteristics of the ironless motor are dependent largely upon the slight difference in the winding method therefor. Therefore, a number of inventions relating to the ironless rotor winding method have been conceived making stepwise improvements. However, no definitive method for winding the ironless rotor for an electric motor has never been put into practice.

SUMMARY OF THE INVENTION

The above-described drawbacks in the prior art have been successfully eliminated by the present invention.

It is, therefore, a primary object of the present invention to provide an ironless rotor winding for a cup-shaped electric motor, which can have sufficient rigidity and excellent efficiency and which can be prepared at a low cost without resorting to a plastic molding process or the like.

Another object of the present invention to provide an ironless rotor winding of the above type, which is significantly flattened in the axial direction.

A further object of the present invention is to provide an ironless rotor winding of the above type, in which the winding of a previous turn and the winding of a subsequent turn are fixedly bonded to each other.

A still further object of the present invention is to provide a method and machine for making the ironless rotor winding of the above type in a series of winding processes.

These objects can be attained according to the present invention by providing an ironless rotor winding for a cup-shaped electric motor, which rotor winding comprises: a winding portion wound through one terminate face of an imaginary column or cylindrical body; a winding portion wound onto the circumference of the imaginary column at an angle of inclination with respect to the axis of rotation of said imaginary column; and a winding portion wound into the other open terminate face of said imaginary column along the circumferencial edge of the same, whereby the overall rigidity of said ironless rotor winding is increased.

The above objects can alternatively be attained according to the present invention by providing an ironless rotor winding for a cup-shaped electric motor, which rotor winding includes a one open terminate face and the other terminate face, wherein the improvement comprises: a winding portion wound through the other terminate face of an imaginary column or cylinder; and a winding portion wound onto the circumference of said imaginary column and including a first inclined segment inclined at an angle with respect to the axis of rotation of said imaginary column, and a second inclined segment turned at an intermediate point between said one open terminate face and said other terminate face such that it extends to an edge point on said one terminate face, whereby the overall rigidity of said ironless rotor winding is increased while preventing the thickness of the circumferential portion of said ironless rotor winding from being excessively increased.

BRIEF DESCRIPTION OF THE DRAWINGS

These and other objects of the present invention will become apparent from the following description of embodiments thereof when taken together with the drawings, in which.

DESCRIPTION OF THE PREFERRED EMBODIMENTS

Before entering into the detailed description of the present invention, several constructions of an ironless rotor winding for an electric motor according to the prior art will now be discussed merely for clearly understanding the background of the present invention with reference to some of the accompanying drawings.

Figure 1:
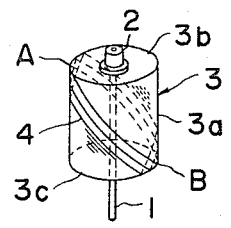
FIG. 1 is a perspective view showing a first example of the conventional method of winding an ironless rotor of an electric motor.
Figure 2:
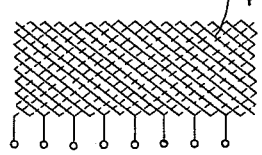
FIG. 2 is a connection diagram of the ironless rotor shown in FIG. 1.

Referring first to FIG. 1, there is shown one of the most popular winding method of an ironless rotor for an electric motor, the disclosure of which can be found, for instance, in U.S. Pat. Nos. 3,191,081 and 3,360,668. According to one of these conventional methods, a winding 4 is wound upon the circumference 3a of an imaginary column 3 (to be formed into an armature), which has its shaft 1 of rotation carrying a commutator 2, such that it is arranged at an angle of inclination with respect to the axis of shaft 1 and such that it is turned back at an edge point A of one terminate (or end) face 3b of the imaginary column 3 at the commutator side and at an edge point B of the other terminate face 3c. According to this ironless rotor winding method, it is advantageous that there is no coil end formed so that the construction of the electric motor obtainable can be simplified. However, since the winding 4 is wound upon the circumference 3a of the imaginary column 3 at an angle with respect to the shaft 1, the number of turns of the winding 4 obtainable is remarkably reduced. Since, moreover, the reduced number of turns is determined solely in dependence upon the diameter and height of the rotor and upon the diameter of the winding 4, the characteristics of the resultant electric motor are accordingly determined. Still moreover, especially in case the ironless rotor has a relatively small height as compared with its diameter, i.e., in case a miniature motor equipped with an ironless core is flattened in the longitudinal direction of the shaft 1, the diameter of the winding 4 usable is remarkably limited to a small value once the number of turns is selected, with another drawback that the starting torque of the motor is highly restricted. Still moreover, the winding 4 is formed only upon the circumference 3a of the imaginary column 3 obliequely of the shaft 1, a considerable reverse torque is established to invite a further drawback that a sufficient starting force cannot be generated. The connection diagram of the ironless rotor according to the winding method of FIG. 1 is shown in FIG. 2.

Figure 3:
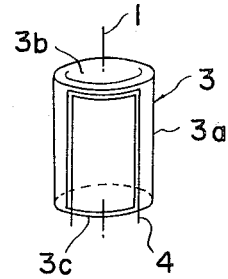
FIG. 3 is also a perspective view showing a second example of the conventional method of winding an ironless rotor of an electric motor.

Turning next to FIG. 3, there is shown another winding method according to the prior art, which cannot be free from the drawback that the thickness of the form of the winding 4 is so increased that the r.p.m. of the resultant motor becomes excessively high due to the shortage in the special magnetic flux density. According to this second winding method, moreover, since most of the turns of the winding 4 made upon the circumference 3a of the imaginary column 3 are arranged in parallel with the shaft 1, the force acting to hold and fasten the turns of the winding 4, which are previously made upon the circumference 3a of the column 3, with the turns of the winding 4, which are subsequently made thereupon, is so weakened that the resultant rotor finds difficulty in maintaining its shape when it is turned. This difficulty is the most prominent especially in case the winding 4 is made of a wire having no surface treatment. Similar difficulty does still exist even if the wiring 4 is made of a wire having a bondable coating. In order to assure sufficient rigidity, therefore, the ironless rotor prepared according to the second winding method has to be subjected to the plastic molding treatment after the winding process. This requirement comes from the fact that the rotor intrinsically has to be turned with sufficient rigidity when in its practical use. Since, however, the ironless rotor according to the method under discussion requires an additional step of the plastic molding process, it requires additional time for preparation so that the cost of its manufacture is accordingly raised. Incidentally, it is well known in the relevant art that the additional plastic molding process is one of the major and direct causes for making the ironless rotor expensive. As a result, since the electric motor obtainable becomes accordingly extensive with all its considerable efficiency, the range of its application is restricted. This drawback has to be taken into consideration in the case of the ironless motor to be used in toys or the like, because neither excessively high efficiency nor semipermanent use are required because of the mode of its use in the toys. In other words, the ironless motor for use in the toys can be said sufficient if it satisfies the necessary conditions that its efficiency and lifetime are more excellent to some extent than the requirements and that it can be produced at a low cost. From this view point, it has to be concluded that the ironless rotor for an electric motor having the construction shown in FIG. 3 cannot be free from many drawbacks.

Figure 5:
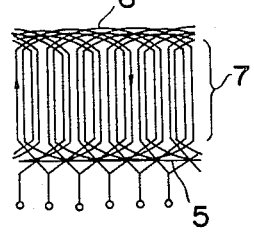
FIG. 5 is also a connection diagram of the ironless rotor shown in FIG. 4.
Figure 4:
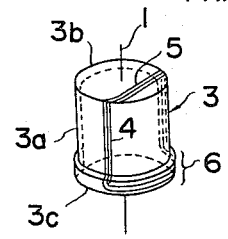
FIG. 4 is also a perspective view showing a third example of the conventional method of winding an ironless rotor of an electric motor.

According to a third conventional winding method shown in FIGS. 4 and 5 and disclosed in Japanese Unexamined Patent Publication No. 77-36702 and in U.S. Pat. No. 3,441,761, the ironless rotor has its winding 4 arranged in parallel with the shaft 1 on the circumference 3a of the imaginary column 3 and at a right angle with respect to the shaft 1 on the terminate faces 3b and 3c of the column 3. In other words, the winding 4 is made such that it is formed into a rectangular shape when it is exploded. As compared to the winding method shown in FIG. 1, according to this third method, the wire used in making the winding 4 upon the imaginary column 3 can have a larger diameter for the same diameter of the ironless column so that the starting torque can be accordingly increased. According to the third method, however, since the both terminate faces 3b and 3c of the imaginary column 3 have to be formed with winding ends 5 and 6, especially the latter of which is bulged at the other terminate face 3c of the columns, as apparent from FIG. 5, the shape of the part constituting the magnetizing circuit of the ironless rotor is so complicated as to establish the fears that the assembly is accompanied by considerable difficulty and that the size of the ironless motor cannot be reduced. Moreover, in case the ironless rotor has a smaller height in comparison with its diameter, i.e., in case the rotor is flattened in the axial direction of the shaft 1, the winding ends 5 and 6, especially, the latter end 6, are remarkably elongated in comparison with the torque generating section 7. As a result, there is established another drawback that the ratio in inertia of the ironless rotor to the torque generated becomes so high that the remarkably short rise time which is one of the greatest features of the ironless motor is completely lost. The third method under discussion, however, retains such an advantage over the second method of FIG. 3 that it can produce an ironless motor which is flattened along the shaft 1. Even in this regard, however, the third method shares such a drawback with the second method of FIG. 3 that the plastic molding process has to be included in the preparation of the ironless rotor.

Figure 6:
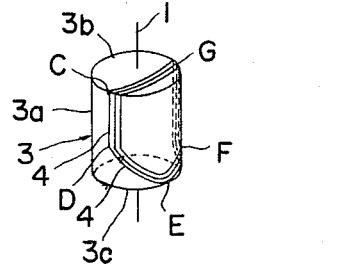
FIG. 6 is also a perspective view showing a fourth example of the conventional method of winding an ironless rotor of an electric motor.
Figure 7:
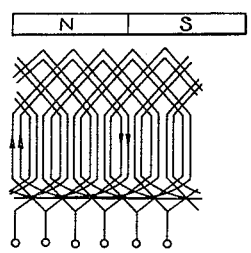
FIG. 7 is also a connection diagram of the ironless rotor shown in FIG. 6.

On the other hand, in the ironless rotor winding method shown in FIGS. 6 and 7 and disclosed in Japanese Unexamined Patent Publication No. 77-36702, the winding 4 is arranged in the manner, as follows: The winding 4 is first wound upon the circumference 3a of the imaginary column 3 in parallel with the shaft 1 from an edge point C on the one terminate face 3b to the other terminate face 3c of the column 3. Midway of the course on the circumference, the winding 4 is turned at an angle with respect to the shaft 1 at a turning point D so that it may extend to an edge point E on the other terminate face 3c of the imaginary column 3. The winding 4 is then turned back from the edge point E at the same angle with respect to the shaft 1 until it reaches another turning point F on the circumference 3a. From this turning point F, the wiring 4 is wound upon the circumference 3a in parallel with the shaft 1 so that it may extend to another edge point G on the one terminate face 3b. From this edge point G, moreover, the winding 4 is made to run straightly to the edge point C on the same terminate face 3b. Thus, the arrangement of one turn of the winding 4 has a pentagonal shape when it is exploded. Incidentally, the connection diagram of the ironless rotor according to this fourth winding method as illustrated in FIG. 7. The ironless rotor prepared according to the fourth winding method shown in FIGS. 6 and 7 has an advantage (a) that since the winding 4 is arranged in parallel with the shaft 1 a wire having a considerable diameter can be used to generate a high starting torque. As has been taught with reference to FIGS. 3 and 4, however, the fourth winding method cannot be free from the drawback that it has to resort to the plastic molding process because the winding 4 is turned in parallel with the shaft 1 so that the rigidity obtainable is not sufficient. The fourth method still has another advantage (b) that the ironless rotor according to this fourth method can be more excellent in strength than that according to the second method shown in FIG. 3 thanks to the construction that the winding 4 is turned midway of the circumference 3a of the imaginary column 3. As compared with the ironless rotor according to the third method shown in FIG. 4, on the other hand, the fourth method being discussed is further advantageous in that the actual outer diameter of the ironless rotor obtainable is not excessively enlarged because no winding end is formed, that the parts of the ironless motor constituting the magnetizing circuit are considerably simplified and easily assembled, and that the mass-producibility of the motor as whole can be remarkably improved. However, although the ironless rotor according to the fourth method has to be sufficiently rigid because a high starting torque can be generated, as has been taught in the former advantage (a), this requirement for sufficient rigidity cannot be met by the ironless rotor because of lack of the wiring ends. This drawback makes necessary the plastic molding process which will raise the production cost of the ironless rotor. On the other hand, the latter advantage (b) is concerned with the case, in which the parts of the electric motor using the ironless rotor having no winding end are directly used. Therefore, this advantage (b) cannot be particularly taken up here in case the parts suitable for the ironless rotor formed with the winding ends are used in advance. According to a third advantage (c) of the fourth method, the overall length of the winding 4 can be so reduced that the inertia of the ironless rotor can be accordingly reduced and that the copper loss can also be reduced to inversely proportionately increase the flow rate of the starting current with the resultant increase in the starting torque. As a result, it is possible to embody an ironless rotor which can have a high torque ratio to the inertia as one of the greatest features of itself thereby to remarkably shorten the rise time or enhance the response. As has been explained in the second advantage, on the contrary, the response thus enhanced requires increase in the rigidity of the ironless rotor so that the fourth method cannot be free from resorting to the plastic molding process. This process accordingly raises the production cost of the ironless rotor.

Figure 8:
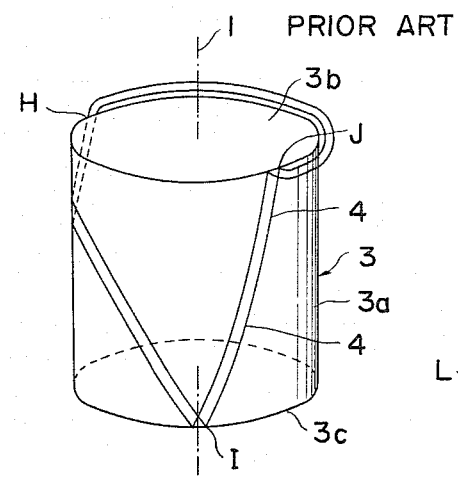
FIG. 8 is also a perspective view showing a fifth example of the conventional method of winding an ironless rotor of an electric motor.
Figure 9:
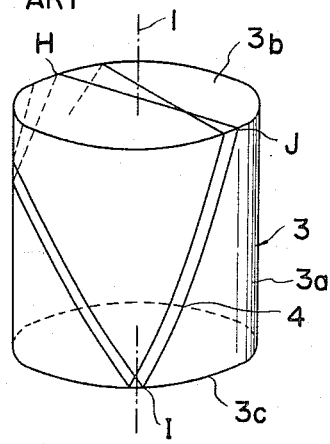
FIG. 9 is also a perspective view showing a sixth example of the conventional method of winding an ironless rotor of an electric motor.

Turning further to FIGS. 8 and 9, description proceeds to the conventional method of an ironless rotor for an electric motor, which is disclosed in Japanese Patent Publication 74-22361. According to this fifth winding method, the winding 4 inclined at a preset angle with respect to the shaft 1 is arranged on the circumference 3a of the imaginary column 3. This winding 4 is connected at the one terminate face 3b of the column 3 with the other winding 4 which is also inclined at a preset angle with respect to the shaft 1 and which is adjacent thereto only at the terminate face 3b. With close reference to FIGS. 8 and 9, more specifically, the winding 4 is made to extend upon the circumference 3a of the column 3a at a preset angle with respect to the shaft 1 from an edge point H on the one terminate face 3b of the column 3 to an edge point I on the other terminate face 3c, and the winding 4 is then turned back to extend upon the circumference 3a at the same angle from the edge point I to another edge point J on the one terminate face 3b. After that, the winding 4 is wound along the circumference of the one terminate 3b from the edge point J until it is returned to the starting point H, as shown in FIG. 8. In an alternative, the winding 4 is made to run straightly along the shortest way, as seen from FIG. 9, from the edge point J to the point H on the terminate face 3b while forming a chord together with the circumferential edge of the end face 3b. As contrary to the foregoing three winding methods shown in FIGS. 3 to 7, the fifth winding method shown in FIGS. 8 and 9 has its winding 4 wound obliquely upon the circumference 3a of the imaginary column 3, thus generating the reverse torque. As a result, the electric motor using the ironless rotor according to the fifth method is inferior in efficiency to any obtained in accordance with the methods shown in FIGS. 3 to 7. This drawback can, however, be offset by the advantage that the ironless rotor can be flattened more in the axial direction than that prepared in accordance with the second method shown in FIG. 3. On the other hand, the method of FIG. 8 cannot be free from formation of the winding ends although this problem is eliminated in the modification of FIG. 9. On the other hand, moreover, the electric motor using the ironless rotor prepared according to the method of FIG. 8 or 9 can acquire considerably high efficiency. Therefore, the ironless rotor according to the method of FIG. 8 or 9 has also to be excellent in rigidity. The ironless rotor of this type is not so wound as to have sufficient rigidity especially at the other terminate face 3c of the imaginary column 3. As a result, in order to increase the rigidity, the ironless rotor has to be subjected to the plastic molding process.

Although a variety of methods for winding an ironless rotor for an electric motor have heretofore been proposed including those thus far discussed, they are advantageous in some points but disadvantageous in other points. Thus, none of them have succeeded in providing an ironless rotor which can satisfy all of the conditions required, i.e., that it is flattened in the axial direction while retaining a high efficiency, that it is sufficiently rigid even if the plastic molding process is omitted, and that its production cost is reasonable. These conditions are required especially for an ironless rotor which is to be used with toys or the like. The ironless rotor for such application has to be more efficient and flatter in the axial direction than that prepared in accordance with the first method shown in FIGS. 1 and 2. The rotor has to be as efficient as that prepared in accordance with the second to fourth methods shown in FIGS. 3 to 7, although failing to exceed in efficiency the latter, or has to be as efficient as or more than that prepared in accordance with the fifth method. Moreover, the rotor has to be excellent in rigidity without resorting to such a plastic molding process as is required in all of the methods shown in FIGS. 3 to 9 so that it can be assembled into an inexpensive electric motor. All of those three conditions have to be satisfied by the ironless rotor. In this respect, incidentally, the life time of the ironless rotor need not be permanent if it is used with toys or the like. However, the winding method having suceeded in satisfying all of these conditions to a sufficient extent has never been disclosed by the prior art. Therefore, it is an earnest desire of the toy industry to provide a method which can prepare an ironless rotor having sufficient rigidity, efficiency and life time at a reasonable cost.

Figure 10:
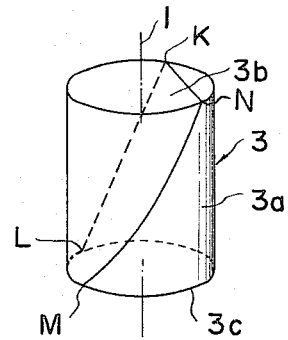
FIG. 10 is also perspective view showing a method of winding an ironless rotor of an electric motor according to the present invention.
Figure 11:
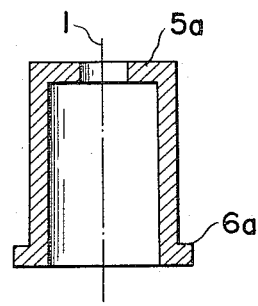
FIG. 11 is a longitudinal section showing the ironless rotor shown in FIG. 10.

Turning now to FIGS. 10 and 11, the present invention will now be described in detail.

In the ironless rotor for an electric motor and the winding method thereof according to the present invention, a self-bondable wire is used as the winding 4. First of all, the winding 4 is arranged upon the circumference 3a of the imaginary or cylinder column 3 such that it extends at a preset angle with respect to the shaft 1 from an edge point K on the one terminate face 3b of the column 3 to an edge point L on the other terminate face 3c. The winding 4 is then arranged a preset length along the circumferential edge of the other terminate face 3c from the edge point L to another edge point M. The winding 4 is then turned back at the same angle of inclination upon the circumference 3a from the edge point M to an edge point N on the one terminate face 3b. After that, the winding 4 is turned at the edge point N generally straightly to the starting edge point K on the one terminate face 3b. After this winding operation of one turn, the winding 4 of another turn is arranged in a similar manner at a preset spacing. These winding operations are cyclically accomplished in a consecutive manner to arrange the winding 4 upon the one terminate face 3b of the imaginary column 3 so that the winding 4 of the previous turn may be fastened by the winding of the subsequent turn. As a result, the rigidity of the winding portion 4 of the ironless rotor is increased at the one terminate face 3b. The above fastening effects can be obtained because the winding 4 is made of the self-bondable wire. More specifically, by the heat which is generated when the winding 4 of the subsequent turn is brought into abutment contact with the winding 4 of the previous turn, the bondable coating or resin applied to the two windings 4 of adjacent turns is melted to bond the windings 4. The windings 4 thus bonded are then left at a room temperature so that they may be fastened. This bonding and fastening operations are also applied to any other adjacent two windings 4. If, incidentally, the heat generation is not sufficient, a heat treatment is added after the winding operation of the ironless rotor is finished. On the other hand, since the winding 4 at the other terminate face 3c of the imaginary column 3 is arranged to extend along the circumferential edge thereof, the winding of the subsequent turn is fastened by the winding of the previous turn in a similar manner while forming a winding 6a. As a result, the portion of the winding 4 at the circumferential edge of the other terminate face 3c (i.e., the portion corresponding to the winding end 6a) is strengthened in rigidity. As better seen from FIG. 11, whereas the one terminate face 3b is formed with a winding end 5a which extends inwardly in the radial direction, the other terminate 3c is formed with the winding end 6a which extends outwardly in the radial direction so that the ironless rotor obtainable can be highly rigid especially at its both ends. At the circumference 3a, on the other hand, since the winding 4 is inclined at a preset angle with respect to the shaft 1, the winding 4 of the previous turn is fastened by the winding 4 of the subsequent turn so that the winding 4 upon the circumference 3a as a whole can be so strengthened as to sufficiently maintain its shape.

As has been described hereinbefore, according to the winding method of the present invention, an ironless rotor having an excellent rigidity can be prepared if the wire used in making the winding has an bondable coating so that the plastic molding process which has been concomitant with the prior art can be omitted. The omission of that process makes it possible to provide an inexpensive ironless motor which is suitable for use with toys or the like. Since, moreover, the portion having no contribution to the torque generation is composed of the winding at the both end faces normal to the shaft, it is possible to provide an ironless motor which can be remarkably flattened in the axial direction and which is excellent in efficiency.

According to the embodiment shown in FIGS. 10 and 11, however, since the winding end 6a bulges from the rotor circumference, it is not easy to assemble the resultant rotor into an electric motor. In order to facilitate this assembly, it is necessary to remove the winding end 6a. For this purpose, another winding method is conceived, which will be described with reference to FIG. 12. According to this second embodiment of the present invention, there is provided such an ironless rotor of cup shape for an electric motor as has its one end face opened and as is prepared by arranging a winding 11 in a meandering shape upon an imaginary column 13. In the ironless rotor thus provided, the preset portion 11a of the winding 11, which is positioned at the opposite side of the open end formed by arranging the winding 11 in the meandering shape upon the circumference 13a of the imaginary column 13 and which is inclined with respect to a shaft 12 of rotation, is wound onto a terminate or end face 13b which is normal to the shaft 12 and which has no relationship with the torque generation. The winding method shown in FIG. 12 is preferred to the conventional winding method shown in FIGS. 1 to 9 for several reasons.

Figure 12:
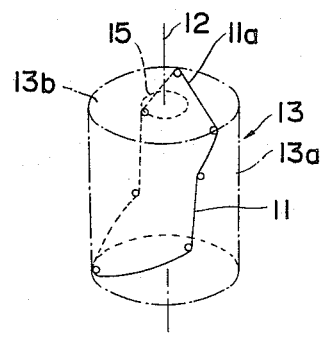
FIG. 12 is an illustrative view illustrating the ironless rotor winding method according to the possible improvement upon that shown in FIGS. 10 and 11.

As seen from FIG. 12, however, since the winding 11 arranged on the circumference 13a of the imaginary column 13 is directed in parallel with the shaft 12, difficulty resides in that there are formed an increased number of bent portions where the winding 11 is bent or turned at an acute angle. Although applied especially to the case in which the winding 11 is not made of a self-bondable wire, it is difficult to prepare an ironless core in a manner that the winding 11 of previous turn is fastened under an overlapped condition by the winding 11 of subsequent turn in case the winding 11 of the subsequent turn is overlapped upon the winding 11, which is wound previously onto the circumference 13a of the imaginary column 13, by turning the column 13.

In view of this, the present invention contemplates to provide as ironless rotor for an electric motor as well as the winding method therefor and the winding machine for effectively practicing the method, in which the overlap area between the windings 11 of the previous and subsequent turns upon the circumference 13a of the imaginary column 13 is increased by slightly inclining the winding 11 arranged in parallel with the shaft 12 so that the winding 11 of the previous turn may be held and fastened under an overlap condition by the winding 11 of the subsequent turn.

Figure 13:
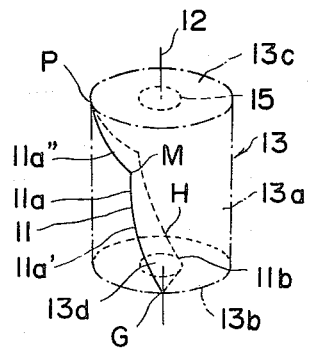
FIG. 13 is also an illustrative view illustrating another embodiment of a method of winding an ironless rotor of an electric motor.
Figure 14:
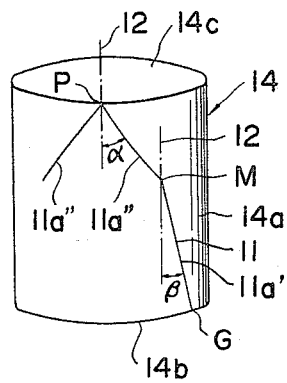
FIG. 14 is also an illustrative view partially illustrating the ironless rotor winding method illustrated in FIG. 13.
Figure 15:
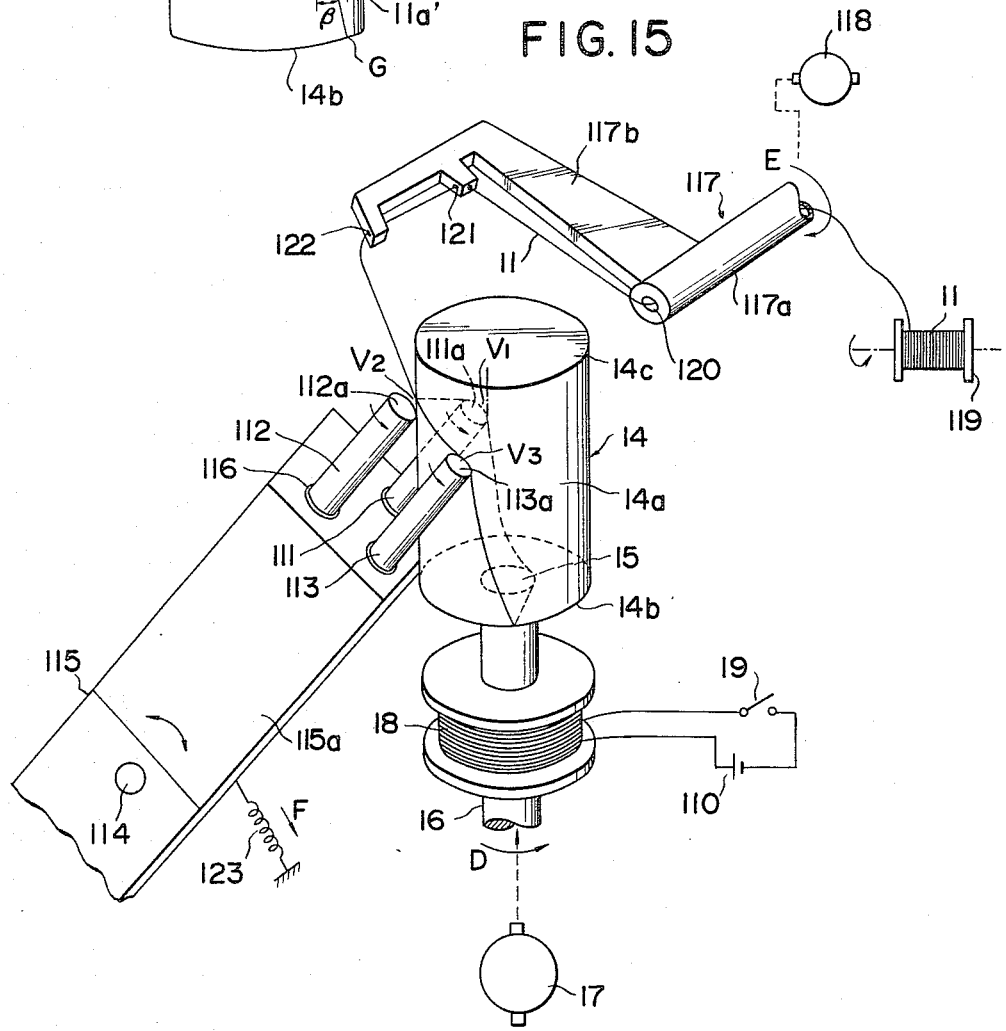
FIG. 15 is an illustrative view illustrating one embodiment of a machine for winding an ironless rotor for an electric motor according to the winding method of the present invention.

With reference to FIGS. 13 to 15, the ironless rotor as well as the method and machine for winding the same will now be described in connection with the embodiments thereof. Referring first to FIG. 13, the ironless rotor according to the present invention is formed to have a shape of the imaginary column or cylinder 13. This column 13 is composed of the shaft 12 of rotation, the circumference 13a, one terminate face 13c having an opening, and the other terminate face 13b closed excepting a portion 13d, to which the shaft 12 is mounted. The ironless rotor is composed of both a winding portion 11b arranged on the other terminate face 13b of the imaginary column 13 and a winding portion 11a arranged on the circumference 13a of the column 13 and including a first inclined segment 11a', which is inclined with respect to the shaft 12, and a second inclined segment 11a'' which is turned or bent from the segment 11a' at an intermediate point M between the one opne terminate face 13c and the other terminate face 13b and which is arranged to extend to an edge point P on the one terminate face 13c.

Turning now to FIG. 15, reference numeral 14 indicates a column (corresponding to the aforementioned imaginary column 13) which is made of an iron (or ferromagnetic) material having its surface polished. A rod 16 is inserted into the portion 15 of the column 14, to which a shaft of rotation is to be mounted, such that it protrudes from the other terminate face 14b but not from the one terminate face 14c of the column 14. The rod 16 thus constructed is driven by a motor 17 so that it may rotate in the direction of arrow D. Moreover, the rod 16 is also made of an iron (or ferromagnetic) material and is wound with a coil 18 of several turns at its preset portion which is located to protrude from the other terminate face 14b of the column 14 thereby to form an electromagnet. The coil 18 has its both terminals connected through a switch 19 and an electric power source 110. Numerals 111, 112 and 113 are column pushing rods acting as pushers, which have their leading end faces 111a. 112a and 113a obliquely abutting at their respective edges against the circumference 14a of the column 14 at the side of the one terminate face 14c. As a result, there are formed V-shaped grooves $V_1$, $V_2$ and $V_3$ between the leading end faces 111a, 112a and 113a of the pushing rods 111, 112 and 113 and the circumference 14a of the column 14, respectively. The angle of inclination of the second inclined segment 11a'' of the winding 11, which is formed by threading the winding 11 into the grooves $V_1$, $V_2$ and $V_3$ in this order, with respect to the shaft 12 is designated at letter $\alpha$, as seen from FIG. 14. Moreover, it is necessary to arrange the pushing rods 111, 112 and 113 and a later-described flyer 117 so that the first inclined segment 11a' of the winding 11 threaded from the V-shaped groove $V_3$ to the edge point G on the other terminate face 14b of the column 14 may have another angle of inclination $\beta$ with respect to the shaft 12. In this instance, the former angle $\alpha$ is preset much higher than the latter angle $\beta$. Reverting to FIG. 15, numeral 115 indicates a support which is rotatably supporting the pushing rods 111, 112 and 113 in a suitable manner for forming the V-shaped grooves $V_1$, $V_2$ and $V_3$. Numeral 116 indicates an oilless metal bearing for ensuring smooth rotations of each of the pushing rods 111, 112 and 113. Moreover, the aforementioned flyer 117 is used to guide the winding and is driven by a motor 118 so that it may rotate in the direction of arrow E. This winding guide flyer 117 is composed of: a cylindrical body 117a formed with a through hole 120, through which the winding 14 is unwound from a rotatably mounted bobbine 119; and an L-shaped arm 117b fixed to the leading side of the cylindrical body 117a, which is positioned to face the column 14. With close reference to FIG. 15, the L-shaped arm 117b has its leading end suitably shaped for guiding the winding 11 onto the column 14 and is formed with winding guide eyes 121 and 122 for suitably guiding therethrough the winding 11 which has passed through the through hole 120. On the other hand, the aforementioned support 115 has its body 115a hinged to rotate about a pivot pin 114 and biased in the direction of arrow F by means of a coil spring 123. These members may be housed in the not-shown body of the winding machine. As a result, the winding 11 having been threaded through the V-shaped grooves $V_1$, $V_2$ and $V_3$ can be prevented from passing downward therethrough. Moreover, the winding guide flyer 117 is so mounted at an adjusted angle in the not-shown body of the winding machine that it can rotate at a suitable angle for winding the winding 11, as seen from FIGS. 13 and 15.

The following operating procedures have to be followed so as to prepare the ironless rotor, as shown in FIG. 13, with the use of the winding machine thus far described.

First of all, as shown in FIG. 15, the pushing rods 111, 112 and 113 are forced obliquely into contact with the circumference 14a of the column 14 at the side of the one terminate face 14c. In this instance, it should be noted that the body 115a of the support 115 rotatably supporting the pushing rods 111, 112 and 113 is so biased by the coil spring 123 as to maintain their forced contact with the circumference 14a of the column 14. Then, the switch 19 is turned on to establish the function as the electromagnet. As a result, the rod 16 and the column 14 are slightly heated so that the mutual adhesion between the windings 11 of the previous and subsequent turns when they are brought into contact can be increased if the windings 11 is made of a self-bondable wire. In any event, the leading end of the winding 11 is taken out of the bobbine 119 and threaded into the through hole 120 and the guide eyes 121 and 122. The winding 11 is then retained at a preset position upon the column 14. After that, the motor 118 is energized to turn the winding guide flyer 117 in the direction of arrow E so that the winding 11 may be threaded through the V-shaped groove $V_1$, $V_2$ and $V_3$ which are formed on the circumference 14a of the column 14. Then, the winding 11 is wound from the last groove $V_3$ onto the circumference 14a of the column 14 at the angle $\beta$ of inclination (which is sufficiently lower than the other angle $\alpha$ of inclination. If the angle $\beta$ becomes excessively high, there arises a difficulty that the undesired reverse torque is generated to provide an inefficient ironless rotor, as has been discussed.) until it reaches the edge point G of the other terminate face 14b, as better seen from FIG. 13. Then, the winding 11 is arranged at a right angle upon the other terminate face 14b. At the center portion of the other terminate face 14b, moreover, the winding 11 is guided by the rod 16 so that it may extend along the circumferential edge of the portion 15, to which the shaft of rotation is to be mounted. After that, the winding 11 is turned to follow the diametrically opposite line from the edge point G (Here, it should be noted that the turning angle is varied with the method used.) until it reaches the opposite edge point H on the other terminate face 14b of the column 14, as seen from FIG. 13. From this edge point H, the winding 11 is further turned upward at the same angle $\beta$ but in the opposite direction upon the circumference 14a of the column 14 until it reaches the V-shaped groove $V_1$. These winding operations are performed one or plural turns. After that, the motor 17 is energized to turn the rod 16 and accordingly the column 14 by a preset angle so that the column 14 thus turned may be subjected repeatedly to the above winding operations. By these consecutively repeated operations, the winding 11 is wound onto the surface of the column 14 (including the circumference 14a and the other terminate face 14b) into the aforementioned shape. Then, the switch 19 is turned off. As a result, the column 14 under a heated condition is cooled down so that the windings 11 of any adjacent turns are bonded to each other. After that, if a light impact is imparted to the column 14, the temporary bondage between the column 14 and the windings 11 is released because the column 14 has a polished smooth surface. As a result, the windings 11 can be easily removed from the column 14. In these ways, the ironless rotor for an electric motor according to the winding method shown in FIG. 13 can be prepared.

Figure 17:
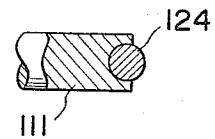
FIG. 17 is also an illustrative view showing another embodiment of the rotatable members which are carried on the leading end of the pusher of the winding machine shown in FIG. 15.

Now, in the foregoing description, the formations of the V-shaped grooves $V_1$, $V_2$ and $V_3$ upon the circumference 14a of the column 14 can be put into practice by forcing the pushing rods 111, 112 and 113, which are carried rotatably on the support 115, into oblique contact with the circumference 14a of the column 14. This method is effective in case the lengths of the pushing rods 111, 112 and 113 are limited, but is improper in case the lengths exceed their proper limit. In case, moreover, it is intended to apply the present invention to the conventional machine, it is sometimes convenient that the leading ends of the pushing rods 111, 112 and 113 obliquely abut against the circumference 14a of the column 14. In this case, it is frequently convenient to arrange the pushing rods 111, 112 and 113 in horizontal positions (or perpendicularly of the shaft of rotation). According to this arrangement, however, it is impossible to form the V-shaped grooves $V_1$, $V_2$ and $V_3$. Then, it is sufficient that steel balls 124 are buried or received rotatably in the leading ends of the pushing rods 111, 112 and 113 which are brought into contact at a right angle with the circumference 14a of the column 14, as shown in FIG. 17. In this instance, the pushing rods 111, 112 and 113 are made irrotational with respect to the support 115. Incidentally, only the pushing rod 111 is illustrated in FIG. 17.

Figure 16:
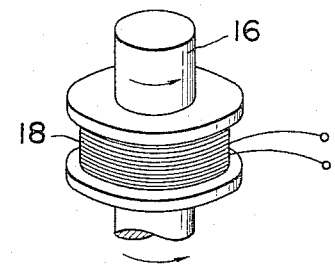
FIG. 16 is also an illustrative view illustrating another embodiment of the winding machine illustrated in FIG. 15 for forming a projection indirectly upon the other terminate face of a column of the winding machine.

In the embodiment thus far described, the rod 16 is fixed to the other terminate face of the column 14. Since, however, both the column 14 and the rod 16 are made of iron, they may be separated from each other because they are converted into electro-magnets when the switch 19 is turned on, as illustrated in FIG. 16.

Figure 18:
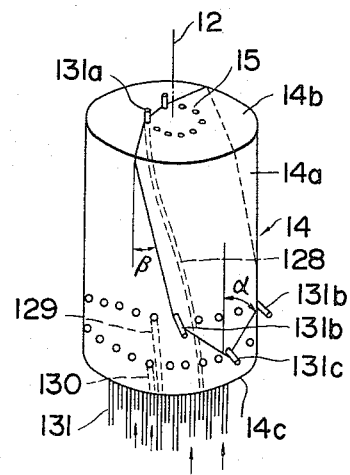
FIG. 18 is also an illustrative view illustrating another embodiment of the winding method according to the present invention.

In the foregoing embodiment, moreover, the pushing rods 111, 112 and 113 and the rod 16 are used as the projections which can be used to guide the winding 11 when it is wound onto the circumference 14a and the other terminate face 14b of the column 14. However, the method shown in FIG. 18 can be followed in case those rods are not used. With close reference to FIG. 18, the column 14 is formed with: a plurality of wire ropes through holes 128 which extend from the one to other terminate faces 14c and 14b (although only one is shown for illustrative purposes only); a plurality of wire ropes through holes 129, although only one is shown, which extend from the one terminate face 14c to the circumference 14a in the vicinity of the same terminate face 14c; and a plurality of wire ropes through holes 130, although only one is shown, which extend from the one terminate face 14c to the circumference 14a at a position spaced at a preset distance from the through holes 129 to the side of the other terminate face 14b (i.e., at the closest distance to the other terminate face 14b). Wire ropes 131 are inserted slidably into the through holes 128, 129 and 130. Incidentally, the wire ropes through holes 128 opened into the other terminate face 14b are arranged along the circumferential edge of the portion 15, to which the shaft of rotation is to be mounted. This arrangement is because there is no obstacle in the mounting position of the shaft 12. The wire ropes 131 are further slid so that their leading ends 131a, 131b and 131c protruding from the circumference 14a and other terminate face 14b of the column 14 may act as projections for guiding the winding 11. The leading ends 131a protruding from the other terminate face 14b have to be two in number because they are required to guide the winding 11 along the circumferential edge of that portion 15. However, the number of the leading ends 131a need not be limited to two but can be more or less than two. In short, the number of the leading ends 131a may be determined in accordance with their application. On the other hand, the number of the leading ends 131b protruding from the circumference 14a of the column 14 may be two, whereas the remaining leading end 131c may be one. These leading ends 131b and 131c are so related as to form a triangle on the circumference 14a of the column 14. In this instance, the angle formed when the winding 11 is threaded through the leading ends 131b, 131c and 131b in this order, as shown, is assumed to be 2α. Likewise, the leading ends 131a and 131b are made to protrude from the other terminate face 14b and the circumference 14a such that the angle of inclination of the winding 11 with respect to the shaft 12 when the winding 11 having passed through the two leading ends 131a upon the other terminate face 14b is arranged to extend from the edge point of the face 14b to the leading end 131b upon the circumference 14a, as shown, is assumed to be β (Here, the former angle α is much higher than the latter angle β.).

With these arrangements, the flyer 117 is driven in the manner shown in FIG. 15. When the column 14 is turned a preset angle so that the winding 11 may be wound onto the column 14 thus turned in the manner shown in FIG. 18, the remaining other wire ropes 131 are slid, while maintaining the above arrangement relationship, so that their leading ends 131a, 131b and 131c may protrude from the other terminate face 14b and circumference 14a of the column 14. In this instance, it is necessary to accommodate in advance those leading ends 131a, 131b and 131c used for the previous turns in the column 14 by sliding their wire ropes 131. Then, the winding 11 guided by the rotations of the flyer 117 is retained on the leading ends 131a, 131b and 131c thus newly extracted so that the ironless rotor for an electric motor according to the winding method shown in FIG. 18 can be prepared.

As is now apparent from the foregoing description, the ironless rotor for an electric motor prepared by the winding method according to the present invention can be flattened in the axial direction because the inclined segment 11a having no contribution to the torque generation is formed in the other terminate face 13b also having no contribution to the torque generation. The winding methods of the prior art, as shown in FIGS. 1 to 9, cannot be free from the drawback that there is established a reverse torque because the winding 4 is wound onto the circumference 3a of the column 3 at a remarkably high angle of inclination with respect to the shaft 1 of rotation. According to the winding method of the present invention, on the contrary, the inclined segment 11a' is wound onto the circumference 13a at a remarkably low angle of inclination with respect to the shaft 12 so that little reverse torque is established, thus making it possible to prepare a highly efficient ironless rotor for an electric motor. In accordance with another embodiment of the present invention, moreover, since the winding 11 is wound at a slight angle of inclination, the winding 11 can be fastened by the bondage with the winding 11 of the next turn.

The winding machine according to the present invention can put the winding operation of the present invention into effective practice, and special devices are made including that the leading ends of the pushing rods for guiding the winding into a preset shape onto the column 14 so that the winding method of the present invention can effect the winding operations in a series of processes. Thus, it can be said that the ironless rotor for an electric motor as well as the method and machine for winding the same according to the present invention can enjoy such remarkable resultant effects as have never been obtained according to any prior art.

Thus, there is provided in accordance with the present invention an ironless rotor winding which has the advantage discussed hereinbefore. The embodiments thus far described are intended to be merely exemplary and those skilled in the art will be able to make variations and modifications in them without departing from the spirit and scope of the invention. All such modifications and variations are contemplated as falling within the scope of the claims.

What is claimed is:

1. An ironless cup-shaped rotor for an electric motor comprising a cylindrical body formed from a continuous winding of consecutive closely spaced turns of heat-treated self-bondable wire, each said turn including a first portion forming a first terminate face of an said cylindrical body, said first portion lying generally in a plane at right angles to the axis of said cylindrical body, a second portion disposed upon the circumference and lying at a first angle to the axis of said cylindrical body, a third portion disposed at the circumferential edge of the other terminate face of said cylindrical body, and a fourth portion also disposed upon the circumference of, and at a second angle substantially equal to said first angle to the axis of said cylindrical body, each said turn being held in place by a heat-treated subsequent turn of said self-bondable wire to form said cylindrical body into a rigid cup-shaped rotor.

2. An ironless cup-shaped rotor as defined in claim 1 wherein said second portion and said fourth portion of each said winding includes two segments, the first of said segments being disposed at a third angle substantially equal to said first and second angles relative to the axis of said cylindrical body and the second of said segments being disposed at a fourth angle to said axis of said cylindrical body, said fourth angle being unequal to said third angle.

3. An ironless cup-shaped rotor as defined in claim 1 wherein said second portion and said fourth portion of each said winding includes two segments, the first of said segments being disposed at a third angle substantially equal to said first and second angles relative to the axis of said cylindrical body and the second of said segments being disposed at a fourth angle to said axis of said cylindrical body, said fourth angle being substantially smaller than said third angle.

4. An ironless rotor as defined in claim 1 or 2 wherein said first portions of said winding are disposed in said plane at right angles to the axis of said cylindrical body such that an area of predetermined diameter about said axis of said cylindrical body is unobstructed.

5. An ironless rotor as defined in claim 4 wherein said first portions of said winding are so disposed relative to the axis of said cylindrical body that the angle formed by said first portions with a plane passing through said axis is not an acute angle.

* * * * *